US008082229B2

(12) United States Patent
Kaijima et al.

(10) Patent No.: US 8,082,229 B2
(45) Date of Patent: Dec. 20, 2011

(54) METHODS FOR BACKING UP A DATABASE

(75) Inventors: Soh Kaijima, Yokohama (JP); Takashi Saitoh, Fujisawa (JP); Kenji Seta, Hiratsuk (JP)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 11/347,487

(22) Filed: Feb. 3, 2006

(65) Prior Publication Data
US 2006/0179085 A1 Aug. 10, 2006

(30) Foreign Application Priority Data
Feb. 4, 2005 (JP) .................................. 2005-028923

(51) Int. Cl.
G06F 7/00 (2006.01)
G06F 17/00 (2006.01)
G06F 13/28 (2006.01)

(52) U.S. Cl. ........ 707/652; 707/661; 707/673; 711/161; 711/162

(58) Field of Classification Search .................. 707/204, 707/999.201, 737, 754, 652, 661, 673; 714/6; 711/113, 161, 162; 709/223, 224
See application file for complete search history.

(56) References Cited

U.S. PATENT DOCUMENTS

| 5,991,771 A * | 11/1999 | Falls et al. ............... 707/202 |
| 6,195,653 B1 * | 2/2001 | Bleizeffer et al. ........... 1/1 |
| 6,397,207 B1 * | 5/2002 | Bleizeffer et al. ........... 1/1 |
| 6,453,325 B1 * | 9/2002 | Cabrera et al. ............ 707/204 |
| 6,466,234 B1 * | 10/2002 | Pyle et al. ............... 715/771 |
| 6,877,016 B1 * | 4/2005 | Hart et al. ............... 707/201 |
| 6,957,221 B1 * | 10/2005 | Hart et al. ............... 1/1 |
| 7,275,051 B2 * | 9/2007 | Hrle .................... 707/718 |
| 7,290,007 B2 * | 10/2007 | Farber et al. ............. 1/1 |
| 7,523,204 B2 * | 4/2009 | D'Costa et al. ........... 709/226 |
| 7,698,253 B2 * | 4/2010 | Hrle ................... 707/999.002 |
| 2003/0200275 A1 * | 10/2003 | Hirabayashi et al. ....... 709/214 |
| 2003/0217027 A1 * | 11/2003 | Farber et al. ............. 707/1 |

FOREIGN PATENT DOCUMENTS

| JP | 08-328929 | 12/1996 |
| JP | 2001-312421 | 11/2001 |
| JP | 2002-082826 | 3/2002 |
| JP | 2003-316633 | 11/2003 |
| WO | WO-01-04797 A1 | 1/2001 |

* cited by examiner

Primary Examiner — Mohammad Ali
Assistant Examiner — Bao Tran
(74) Attorney, Agent, or Firm — Mollborn Patents, Inc.; Fredrik Mollborn

(57) ABSTRACT

Various embodiments of a method, system and computer program product backup and recover a database. A database is distributed in a plurality of storage devices. A target designation designating a target database is received. One or more storage devices of the plurality of storage devices, storing at least a portion of the target database, are selected. A quiesce point is established by completing an ongoing transaction for the target database and inhibiting a further transaction. In response to establishing the quiesce point, a backup is generated by collectively copying data on each storage device of the one or more selected storage devices. The backup associated with a quiesce point indication indicating backed up data of the said each storage device of the one or more selected storage devices in accordance with the quiesce point, are recorded.

8 Claims, 10 Drawing Sheets

METHODS FOR BACKING UP A DATABASE

CROSS-REFERENCE TO RELATED APPLICATIONS

This patent application claims benefit under 35 USC §119 to Application no. JP2005-028923, filed in the Japanese Patent Office on Feb. 4, 2005 by International Business Machines Corporation titled "Backup Generating Apparatus, Recovery Processing Apparatus, Backup Generating Method, Recovery Processing Method, and Program" which is hereby incorporated herein by reference.

BACKGROUND OF THE INVENTION 1.0. Field of the Invention

The present invention relates to a computer-implemented method, system and computer program product for backing up and recovering a database.

2.0. Description of the Related Art

Computer systems and databases have been used in key businesses of companies and their importance to company operations has increased rapidly. Thus, there is a demand for hardware and techniques that can efficiently back up the contents of a database to prepare for the occurrence of system malfunctions or disasters, and that will not interrupt or otherwise adversely affect normal operations while performing the backup process. To satisfy such a demand, it is desirable to backup a database quickly.

In some current conventional storage systems, such as Storage Area Network (SAN) and Network Attached Storage (NOS), storage devices may have a volume copy function for copying the contents stored on the storage devices at high speed. For example, a technique has been proposed in which each time data are updated they are stored in a plurality of storage devices by mirroring one of which will used as a backup at a desired time (see Japanese Published Patent Application JP2002-082826).

A backup process may generate a backup at high speed by utilizing a volume copy function. However, a recent database may be stored, part-by-part, in a plurality of storage devices in order to increase processing speed and distribute the processing load. In addition, a single storage device may store respective portions of several databases in order to efficiently use storage areas.

Thus, if the volume copy function is directly employed, data unnecessary for the generation of a backup may be copied, or the data for the generation of a backup may be insufficient. Furthermore, to maintain consistency, a backup of a database should be generated after a transaction on the database is completed. If volume copying is simply performed for each storage device, a backup might be generated without maintaining the consistency for the entire database. Therefore, there is a need for an improved technique to backup a database.

SUMMARY OF THE INVENTION

To overcome the limitations in the prior art described above, and to overcome other limitations that will become apparent upon reading and understanding the present specification, various embodiments of a computer-implemented method, computer system and computer program product are provided which backup a database. In some embodiments, a computer-implemented method, computer system and computer program product are provided which recover a database based on the backup.

In various embodiments, a database is distributed in a plurality of storage devices. A target designation designating a target database is received. One or more storage devices of the plurality of storage devices, storing at least a portion of the target database, are selected. A quiesce point is established by completing an ongoing transaction for the target database and inhibiting a further transaction. In response to establishing the quiesce point, a backup is generated by collectively copying data on each storage device of the one or more selected storage devices. The backup associated with a quiesce point indication indicating backed up data of the said each storage device of the one or more selected storage devices in accordance with the quiesce point, are recorded.

Other embodiments of backing up a database are provided. A target designation designating target data in the database is received. Related data in the database to be updated together with the target data to maintain consistency of the database is selected. A backup is generated based on the related data and the target data.

Various embodiments of recovering a database are provided. The database is distributed in a plurality of storage devices, and there is a backup of each storage device of the plurality of storage devices. The backup is acquired for each storage device. In association with the backup of each storage device, a quiesce point indication indicating backed up data of each storage device is acquired. The backed up data is based on a quiesce point. For each storage device, a recovery process is selected. For each storage device, in response to the selected recovery process being a collective copying process, contents of that storage device are recovered by collective copying, and in response to the selected recovery process being to recover based on the quiesce point indication, contents of that storage device are recovered based on the indicated backed up data of the quiesce point indication.

In this way, various embodiments of the present invention generate a backup in an efficient manner.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that various embodiments of the present invention can be utilized to backup and recover a database.

A database is distributed in a plurality of storage devices. A target designation designating a target database is received. One or more storage devices of the plurality of storage devices, storing at least a portion of the target database, are selected. A quiesce point is established by completing an ongoing transaction for the target database and inhibiting a further transaction. In response to establishing the quiesce point, a backup is generated by collectively copying data on each storage device of the one or more selected storage devices. The backup associated with a quiesce point indication indicating backed up data of the said each storage device of the one or more selected storage devices in accordance with the quiesce point, are recorded.

Other embodiments of backing up a database are provided. A target designation designating target data in the database is received. Related data in the database to be updated together with the target data to maintain consistency of the database is selected. A backup is generated based on the related data and the target data.

Various embodiments of recovering a database are provided. The database is distributed in a plurality of storage devices, and there is a backup of each storage device of the plurality of storage devices. The backup is acquired for each storage device. In association with the backup of each storage device, a quiesce point indication indicating backed up data of each storage device is acquired. The backed up data is based on a quiesce point. For each storage device, a recovery process is selected. For each storage device, in response to the selected recovery process being a collective copying process, contents of that storage device are recovered by collective copying, and in response to the selected recovery process being to recover based on the quiesce point indication, contents of that storage device are recovered based on the indicated backed up data of the quiesce point indication.

Figure 1:
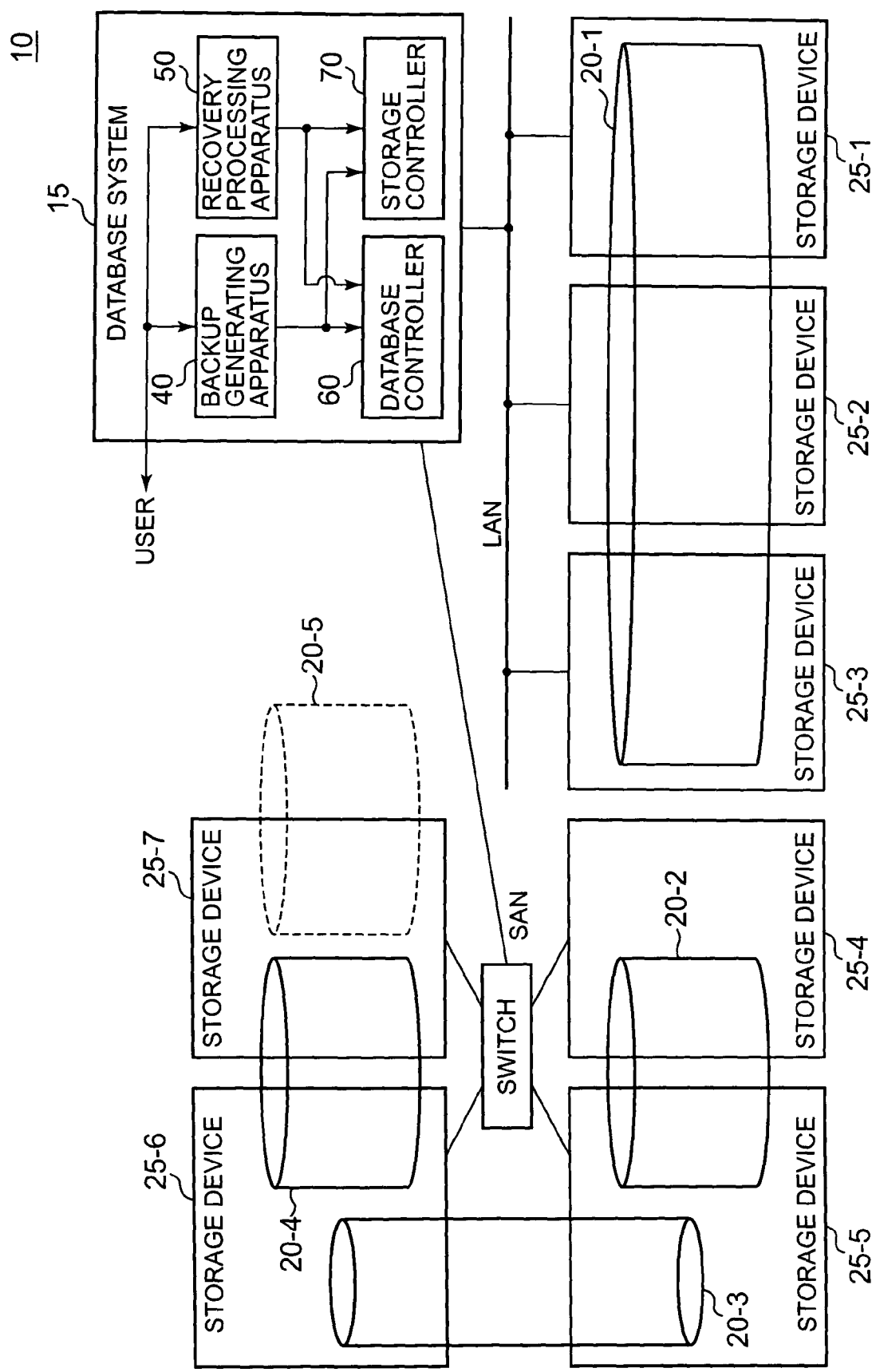
FIG. 1 depicts an overall configuration of an information processing system.

FIG. 1 depicts the overall configuration of an information processing system 10. The information processing system 10 comprises a database system 15 and storage devices 25-1 to 25-7. The database system 15 accesses the storage devices 25-1 to 25-7 in accordance with external instructions, and generates backups for the storage devices 25-1 to 25-7, or performs a recovery process based on these backups. Each of the storage devices 25-1 to 25-7 stores at least a portion or portions of the databases 20-1 to 20-4, and the storage devices 25-1 to 25-7 function, in their entirety, as the databases 20-1 to 20-4.

The storage devices 25-1 to 25-7 may be of different models or types. For example, the storage devices 25-1 to 25-3 may be connected to the database system 15 by a Local Area Network (LAN) and function as Network Attached Storage (NAS) devices, while the storage devices 25-4 to 25-7 may form a Storage Area Network (SAN) by using a ring network, such as Fibre Channel, and may be connected to the database system 15 via a switch. In some embodiments, each of the storage devices 25-1 to 25-3 may be of a different model, and each of the storage devices 25-4 to 25-7 may be of a different model. In various embodiments, a storage device is a single physical device, for example, a hard disk drive; and in some embodiments, a storage device is one of volumes or partitions provided on a hard disk drive.

The database system 15 includes a backup generating apparatus 40, a recovery processing apparatus 50, a database controller 60 and a storage controller 70. In various embodiments, the backup generating apparatus 40 generates a backup of a database that is distributed and stored in at least one of the storage devices 25-1 to 25-7. In various embodiments, the recovery processing apparatus 50 performs a recovery process during which the content of the database, that has been distributed and stored in at least one of the storage devices 25-1 to 25-7, is recovered based on a backup generated for each of the storage devices. The database controller 60 controls each of the databases 20-1 to 20-4 by performing a transaction for each of the databases 20-1 to 20-4. The storage controller 70 controls each of the storage devices 25-1 to 25-7 by issuing a command to a controller provided in each of the storage devices 25-1 to 25-7.

In various embodiments, the database system 15 generates a backup quickly and efficiently when a database is distributed and stored in a plurality of storage devices of different models, and, in some embodiments, when a plurality of databases coexist in a single storage device.

Figure 2:
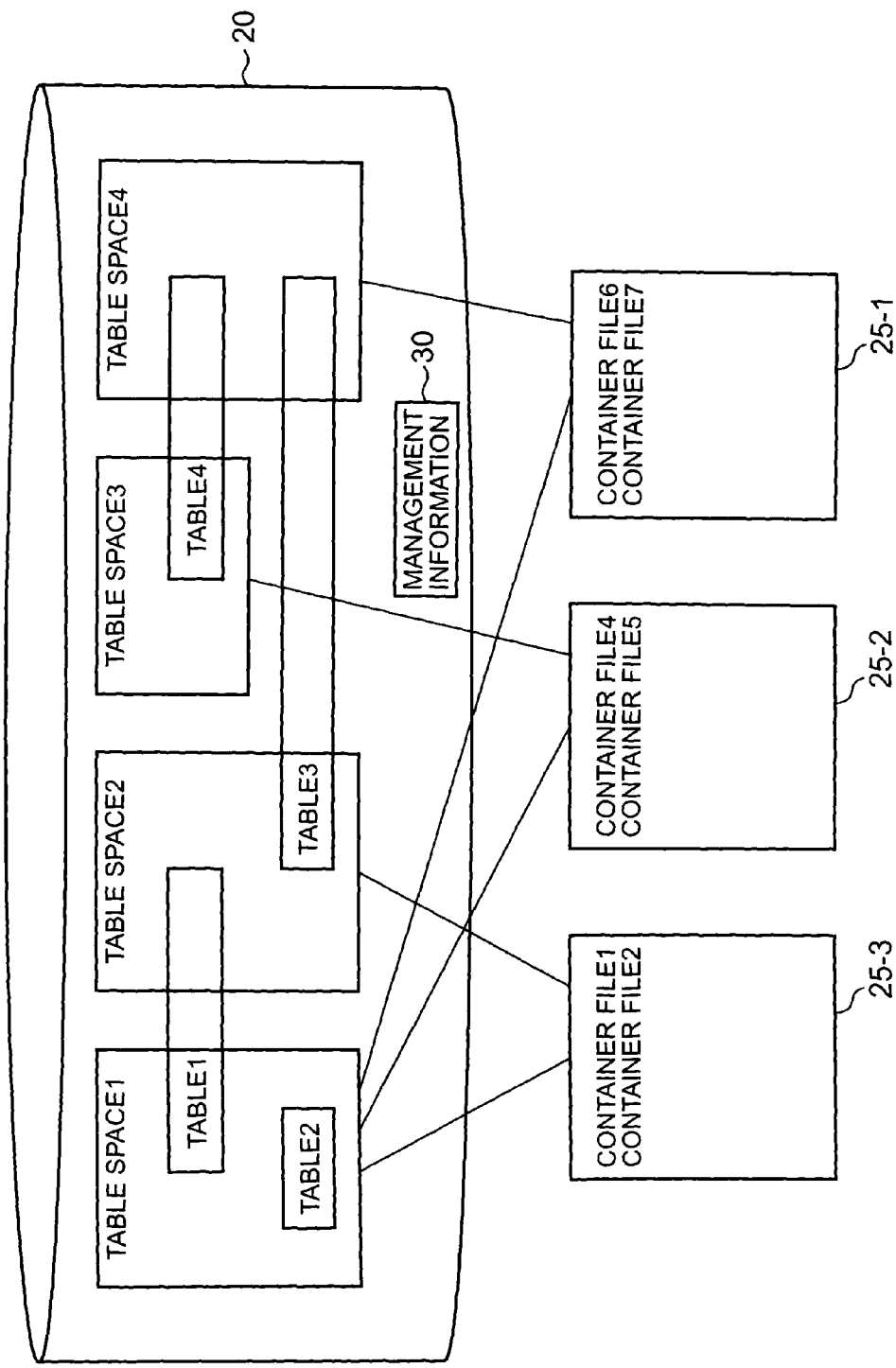
FIG. 2 depicts an exemplary structure of a database.

FIG. 2 depicts an exemplary structure of the database 20. The database 20 includes four tables, TABLE1, TABLE2, TABLE3 and TABLE4, and a management information storage area 30 where management information that defines the structure is stored. Generally, a table is a set of data in a database in which a plurality of associated data are organized in a matrix configuration. In various embodiments, in practice, the database 20 comprises a plurality of table spaces. For example, in FIG. 2, each of table spaces 1, 2, 3 and 4 stores at least a portion of tables 1, 2, 3 and 4, and table spaces 1, 2, 3 and 4 function, as a whole, as tables 1, 2, 3 and 4. In some embodiments, the relationship between a table space and a table is defined by the management information recorded in the management information storage area 30.

Figure 3:
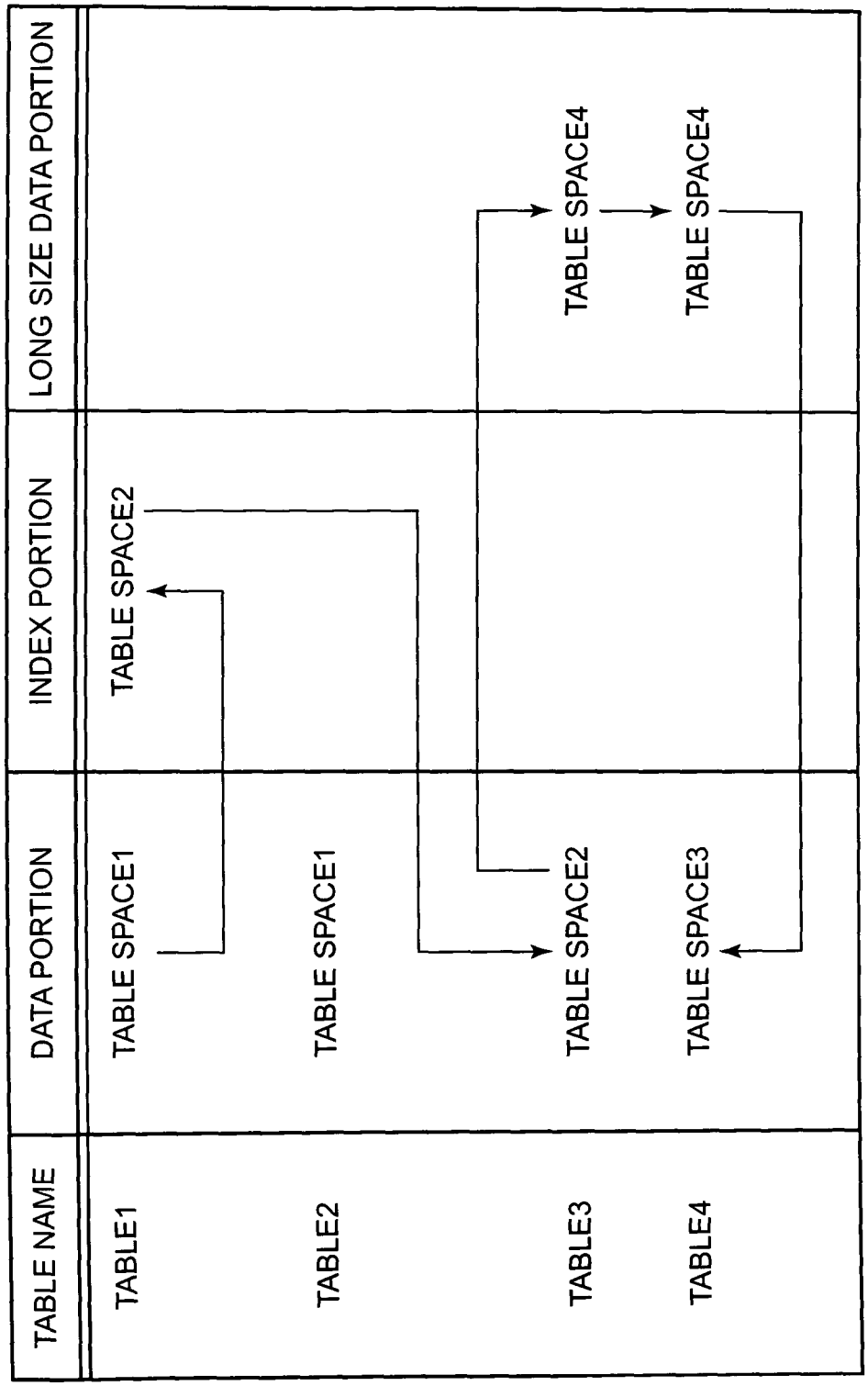
FIG. 3 depicts an example of a data structure of a management information storage area.

FIG. 3 depicts an example of a data structure of the management information storage area 30. According to the management information recorded in the management information storage area 30, a data portion for storing data in table 1 is included in table space 1. An index portion for storing an index in table 1 is included in table space 2. A data portion for storing data in table 2 is included in table space 1. Table 2 has no other portions.

A data portion of table 3 is included in table space 2, and a long size data portion in table 3, where data equal to or exceeding a reference size is stored, is included in table space 4. A data portion of table 4 is included in table space 3, and a long size data portion of table 4 is included in table space 4. Although the structures of all the tables and table spaces are collectively described with reference to the data structure of FIG. 3, in other embodiments, the management information may be distributed and recorded for each table or table space.

As described above, the access speed and efficiency of the data addition/deletion process in a recent database can be increased by distributing and storing a single table in a plurality of table spaces.

Referring also to FIG. 2, table spaces 1, 2, 3 and 4 are distributed and stored in the storage devices 25-1, 25-2 and 25-3. For example, table space 1 includes a container file 1 stored in the storage device 25-3, a container file 4 stored in the storage device 25-2 and a container file 6 stored in the storage device 25-1. Table space 2 has only container file 2 stored in the storage device 25-3. Table space 3 includes only container file 5 stored in the storage device 25-2, and table space 4 includes only container file 7 stored in the storage device 25-1.

The information indicating this structure may also be stored as management information in the management information storage area 30. In some embodiments, information indicating the table space(s) that constitute each database may be recorded as management information in the management information storage area 30. In addition, information indicating the location of a container file that forms each table space may be recorded as management information in the management information storage area 30. The information indicating the location of the container file is, for example, information indicating a path to the file in a file system of a storage device.

As shown in FIGS. 2 and 3, a table may be distributed and stored in a plurality of table spaces, and a table space may be distributed and stored as files in a plurality of storage devices. Therefore, in various embodiments, even when a user designates only one table space as a target for backup, a backup including other table spaces is generated so that the consistency of the table is maintained. Furthermore, when a collective copying process for a storage device is to be performed for high speed processing, table spaces stored in the storage device together with a desired table space are considered.

In various embodiments, the backup generating apparatus 40 (FIG. 1) selects, as a backup target, a minimum group of data to maintain consistency when a table space that constitutes a portion of a database is to be backed up.

Figure 4:
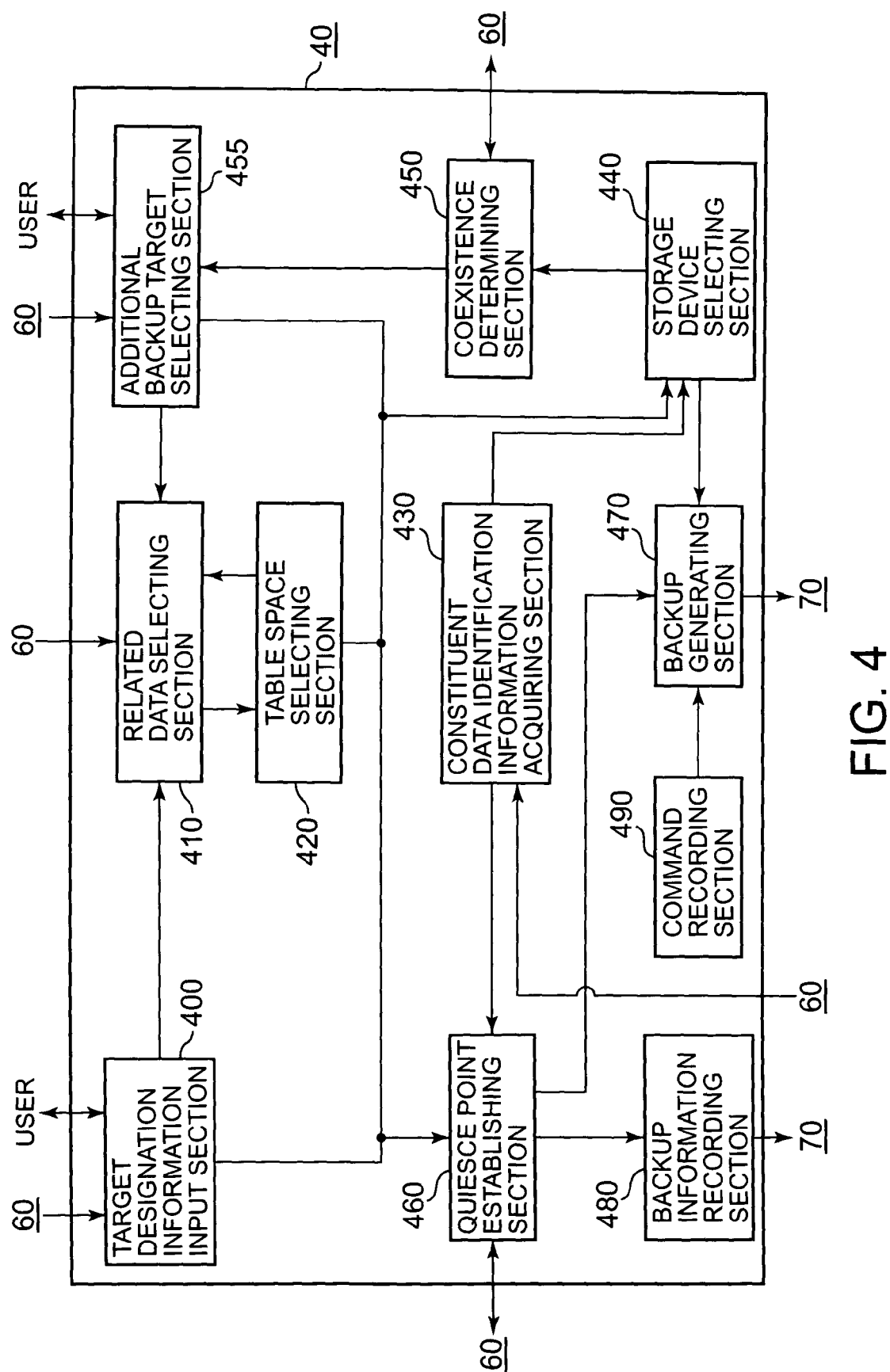
FIG. 4 depicts a functional block diagram of a backup generating apparatus of FIG. 1.

FIG. 4 depicts a functional block diagram of the backup generating apparatus 40 of FIG. 1. The backup generating apparatus 40 comprises a target designation information input section 400, a related data selecting section 410, a table space selecting section 420, a constituent data identification information acquiring section 430, a storage device selecting section 440, a coexistence determining section 450, a quiesce point establishing section 460, a backup generating section 470, a backup information recording section 480 and a command recording section 490. The target designation information input section 400 inputs target designation information to designate a target for the generation of a backup. For example, the target designation information input section 400 may obtain, from the database controller 60 (FIG. 1), a list of databases existing in the information processing system 10 (FIG. 1), present the list to a user, and receive, from the user, information designating one of the databases.

The target designation information may be information designating a database as a backup target, or designating target data in one of the databases for which a backup is to be generated. The target data is a constituent of the database, which may be one of the table spaces described with reference to FIG. 2. An embodiment in which a target database or a table space is designated by the target designation information is described below.

The related data selecting section 410 selects related data to be updated with a table space when the table space is designated by the target designation information so that the consistency of the database is maintained. For example, this process is performed in accordance with the management information obtained from the management information storage area 30 (FIG. 1) by the database controller 60 (FIG. 1). In some embodiments, as shown in FIGS. 2 and 3, when table space 1 is designated, index portion 1 of table 1 is updated with the data portion of table 1 in order to maintain the consistency of table 1. Thus, the related data selecting section 410 selects the index portion of table 1 as related data. Thereafter, the table space selecting section 420 selects table space 2, which includes the index portion of table 1 which was selected by the related data selecting section 410.

The related data selecting section. 410 further selects, for each of the table spaces selected by the table space selecting section 420, related data for all the data included in that table space. That is, since the data portion of table 3 is included in table space 2, the related data selecting section 410 further selects the long size data portion of table 3 as related data, and the table space selecting section 420 further selects a table space that includes the related data selected by the related data selecting section 410. Since the long size data portion of table 3 is included in table space 4, the table space selecting section 420 selects table space 4. This process is repeated until new related data is no longer selected by the related data selecting section 410. As a result, the table space selecting section 420 selects table spaces 1, 2, 4 and 3 successively in this order.

The constituent data identification information acquiring section 430 acquires, in association with each database, identification information of constituent data that constitute the database. In some embodiments, the constituent data identification information acquiring section 430 acquires information identifying the table spaces that constitute the respective databases and the paths to the container files included in the table spaces. Storage devices storing the respective databases can be identified by acquiring the paths to the container files.

The storage device selecting section 440 selects all storage devices that store at least a portion of a target database when the target database is designated by the target designation information in same embodiments, for each constituent data corresponding to the target database, the storage device selecting section 440 selects all storage devices that store the constituent data. In addition, when a table space is designated by the target designation information, the storage device selecting section 440 selects all storage devices that store at least a portion of data including the designated table space and all the table spaces selected by the table space selecting section 420.

The coexistence determining section 450 determines, for each of the storage devices selected by the storage device selecting section 440, whether at least a portion of a different database is stored in that storage device. When at least a portion of a different database is stored in one of the storage devices selected by the storage device selecting section 440, the additional backup target selecting section 455 displays, for the user, information indicating that condition and the different database. Thereafter, in accordance with the user's instruction, the additional backup target selecting section 455 selects the different database as an additional backup target.

In one embodiment, the storage device selecting section 440 selects all storage devices that store the different database selected by the additional backup target selecting section 455. This process is repeated until no more databases are selected by the additional backup target selecting section 455. For example, assuming that database 20-2 in FIG. 1 has been designated by the target designation information, the processing is terminated when the additional backup target selecting section 455 selects databases 20-3 and 20-4 successively in this order, and does not select database 20-5 in accordance with the user's instruction.

In another embodiment, the additional backup target selecting section 455 only selects a table space constituting a portion of a different database when the table space is also stored in one of the storage devices selected by the storage device selecting section 440. In this embodiment, the related data selecting section 410 further selects related data of the table space, and the table space selecting section 420 selects a table space including the related data. Thereafter, the related data selecting section 410 and the table space selecting section 420 repeat the above processing.

Hereinafter, a portion including the target database or table space designated by the target designation information, the different database selected by the additional backup target selecting section 455, and the table space having the related data is called a backup target portion.

When the target designation input section 400 inputs the target designation information, the related data selecting section 410 selects all the related data, and the additional backup target selecting section 455 selects all the target databases for backup, the backup generating apparatus 40 performs the following process. The quiesce point establishing section 460 establishes a quiesce point by completing an ongoing transaction for the backup target portion and inhibiting any further transaction. In some embodiments, the quiesce point establishing process may be provided, for example, by the function of the database controller 60 (FIG. 1) enabled by an instruction.

The backup generating section 470 generates a backup of the backup target portion in response to completing the quiesce point establishing process. In some embodiments, for each of the storage devices selected by the storage device selecting section 440, the backup generating section 470 performs a collective copying process for collectively copying the entire contents of that storage device to generate a backup. The command for the collective copying process varies, depending on the model of the storage device. Therefore, the commend recording section 490 records collective copying commands in association with information indicating the models of the storage devices. The backup generating section 470 performs the collective copying process for each of the storage devices by obtaining the command corresponding to the model of that storage device from the command recording section 490 and executing the command. Further, the backup generating section 470 may generate a backup of management information for managing a target database in response to the entire target database being designated by the target designation information.

The backup information recording section 480 records, in association with a backup generated by the backup generating section 470, quiesce point established data indicating information, that is, a quiesce point indication, that indicates data for which the backup has been generated with the quiesce point establishing process completed in each of the storage devices. The quiesce point established data indicating information may be information indicating the paths to container files for which backups have been generated in accordance with the quiesce point.

Figure 5:
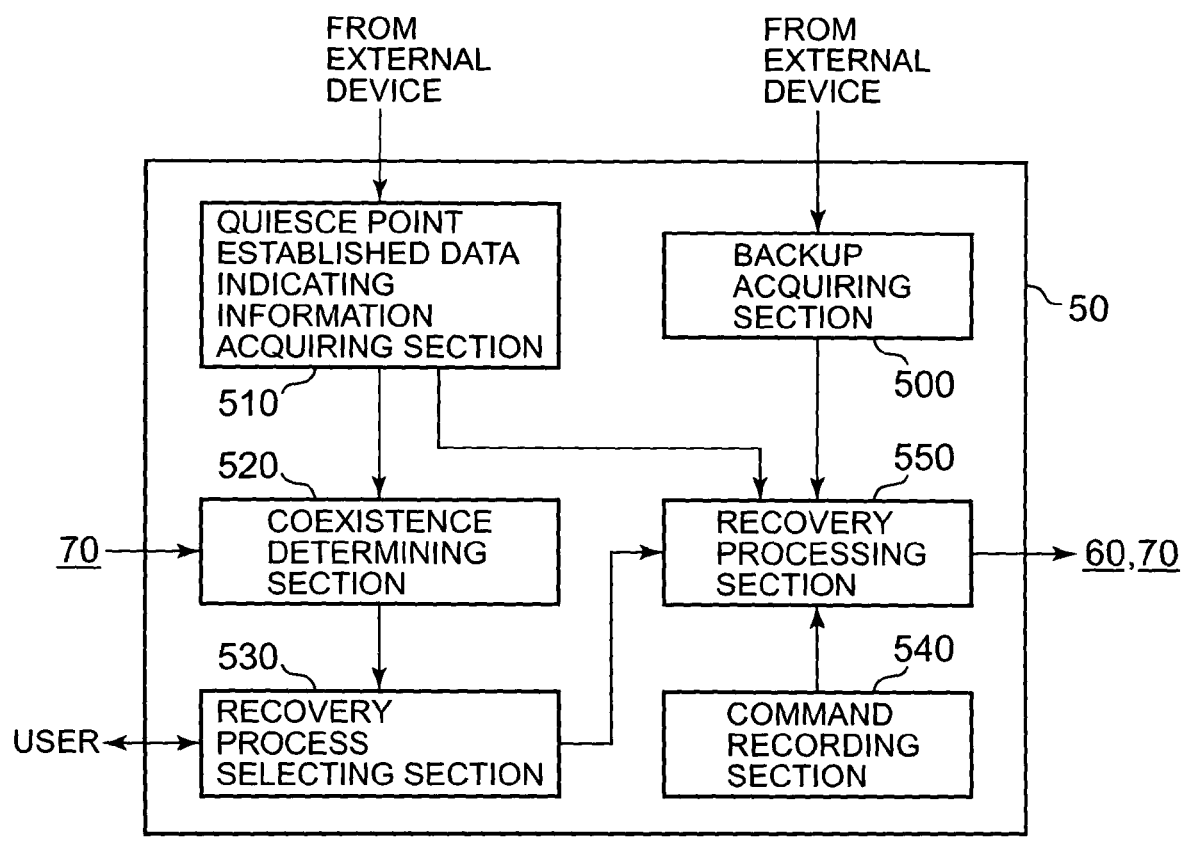
FIG. 5 depicts a functional block diagram of a recovery processing apparatus of FIG. 1.

FIG. 5 depicts a functional block diagram of the recovery processing apparatus 50 of FIG. 1. The recovery processing apparatus 50 includes a backup acquiring section 500, a quiesce point established data indicating information acquiring section 510, a coexistence determining section 520, a recovery process selecting section 530, a command recording section 540 and a recovery processing section 550. The backup acquiring section 500 acquires, for each storage device, a backup generated by the backup generating apparatus 40 (FIG. 4). The quiesce point established data indicating information acquiring section 510 acquires, in association with a backup for each storage device, quiesce point established data indicating information that indicates data for which a backup has been generated with the quiesce point establishing process completed in that storage device. The coexistence determining section 520 determines, for each storage device, whether data, other than the data indicated by the quiesce point established data indicating information, is also stored.

The recovery process selecting section 530 selects, for each storage device, a recovery process for recovering the stored contents of that storage device based on, for example, a user's instruction. In some embodiments, the recovery process selecting section 530 selects either the recovery of the stored contents of that storage device using the collective copying process for collectively copying the entire storage device, or the recovery for each data identified by the quiesce point established data indicating information.

The recovery process selecting section 530 may automatically select a recovery process, regardless of the user's instruction. For example, the recovery process selecting section 530 automatically selects the recovery of each data indicated by the quiesce point established data indicating information in response to data other than the data indicated by the quiesce point established data indicating information also being stored in a storage device. Alternately, the recovery process selecting section 530 selects the recovery by the collective copying process in response to data other than the data indicated by the quiesce point established data indicating information not being stored in the storage devices.

The command recording section 540 records, in association with information indicating the model of a storage device, a command to perform the collective copying process in the storage device of that model. The recovery processing section 550 recovers, for each storage device, the stored contents of that storage device by obtaining a command corresponding to the model of that storage device from the command recording section 540 in response to the recovery by the collective copying process being selected, and executing that command. Alternately, the recovery processing section 550 recovers, for each storage device, the stored contents of that storage device for each data indicated by the quiesce point established data indicating information in response to the recovery for each of the indicated data being selected.

Figure 6:
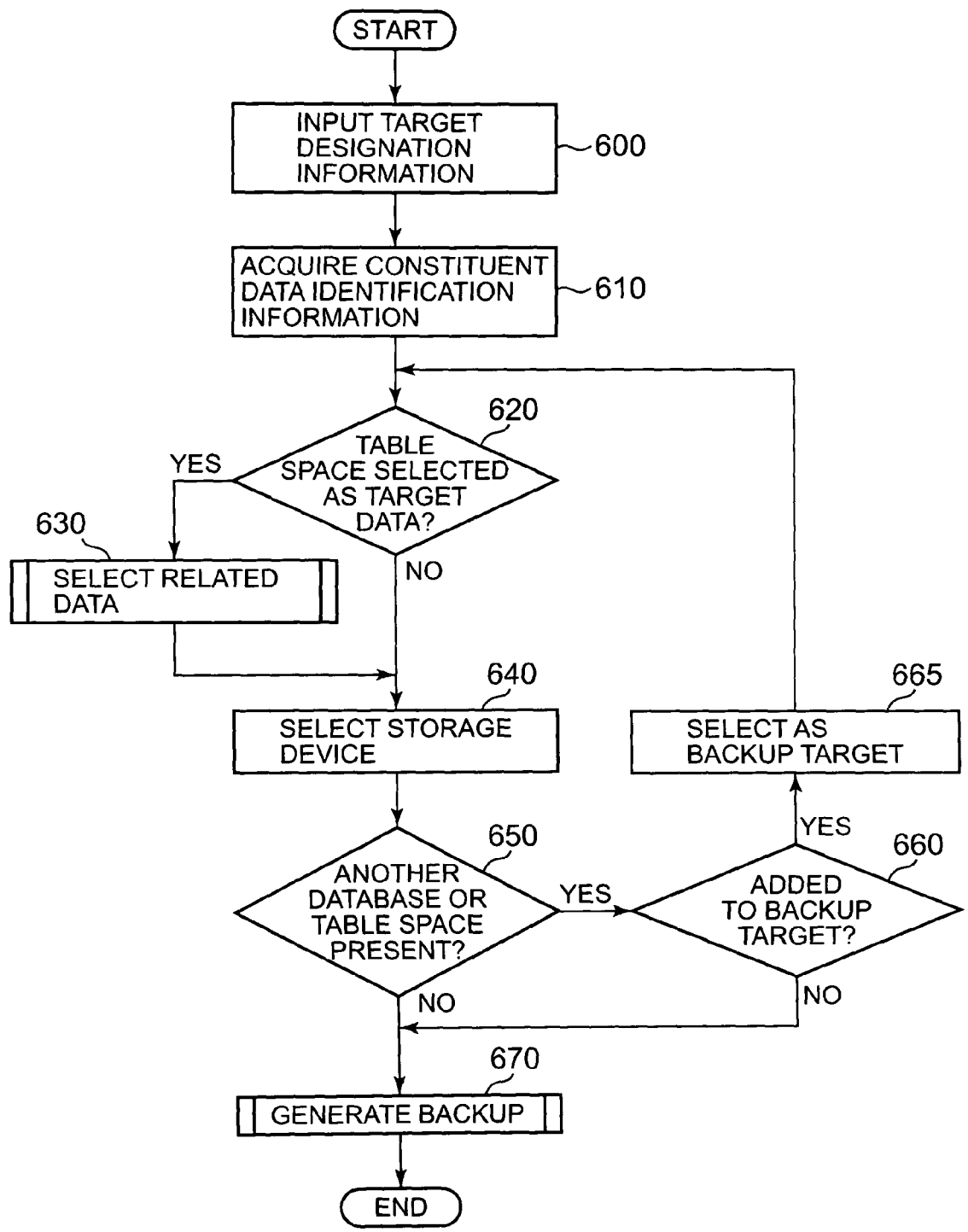
FIG. 6 depicts a flowchart of an embodiment of a backup generating process performed by the backup generating apparatus of FIG. 4.

FIG. 6 depicts a flowchart of an embodiment of the backup generating process performed by the backup generating apparatus 40 of FIG. 4. In step 600, the target designation information input section 400 (FIG. 4) inputs target designation information designating a target for which a backup is to be generated. For example, the target designation information input section 400 (FIG. 4) may obtain, from the database controller 60 (FIG. 1), a list of databases existing in the information processing system 10 (FIG. 1), display the list for a user, and receive information from the user designating one of the databases. In step 610, the constituent data identification information acquiring section 430 (FIG. 4) acquires, in association with each database, identification information of constituent data that constitute that database.

Step 620 determines whether a table space is selected as target data. If so, that is, in response to step 620 determining that a table space is designated by the target designation information (YES at 620), in step 630, the related data selecting section 410 (FIG. 4) selects related data that is to be updated together with the table space in order to maintain the consistency of the database.

In step 640, the storage device selecting section 440 (FIG. 4) selects all storage devices that store at least a portion of a target database when the target database is selected by the target designation information. When a table space is designated by the target designation information, the storage device selecting section 440 (FIG. 4) selects all storage devices that store at least a portion of data including the designated table space and all table spaces selected by the table space selecting section 420 (FIG. 4).

In step 650, the coexistence determining section 450 (FIG. 4) determines, for each of the storage devices selected by the storage device selecting section 440 (FIG. 4), whether a different database or a different table space that has not yet been designated as a backup target is stored in that storage device. In response to, in step 650, the coexistence determining section 450 (FIG. 4) determining that such a different database or table space has been stored in one of the storage devices selected by the storage device selecting section 440 (FIG. 4) (YES at 650), in step 660, the additional backup target selecting section 455 (FIG. 4) asks the user whether the different database or table space is to be added as a backup target.

In response to, in step 660, receiving an instruction to add the database or table space as a backup target (YES at 660), in step 665, the additional backup target selecting section 455 (FIG. 4) selects the different database or table space as a backup target. The backup generating apparatus 40 (FIG. 4) proceeds to step 620 to continue processing.

In response to, in step 650, determining that a database or a table space that has not been designated as a backup target is not stored in any of the storage devices selected by the storage device selecting section 440 (FIG. 4) (NO at 650), in step 670, the backup generating section 470 (FIG. 4) performs a backup generating process. In addition, if in step 660, an instruction is received to not add the different database or table space as a backup target (NO at 660), the backup generating section 470 (FIG. 4) proceeds to step 670 to perform a backup generating process.

Figure 7:
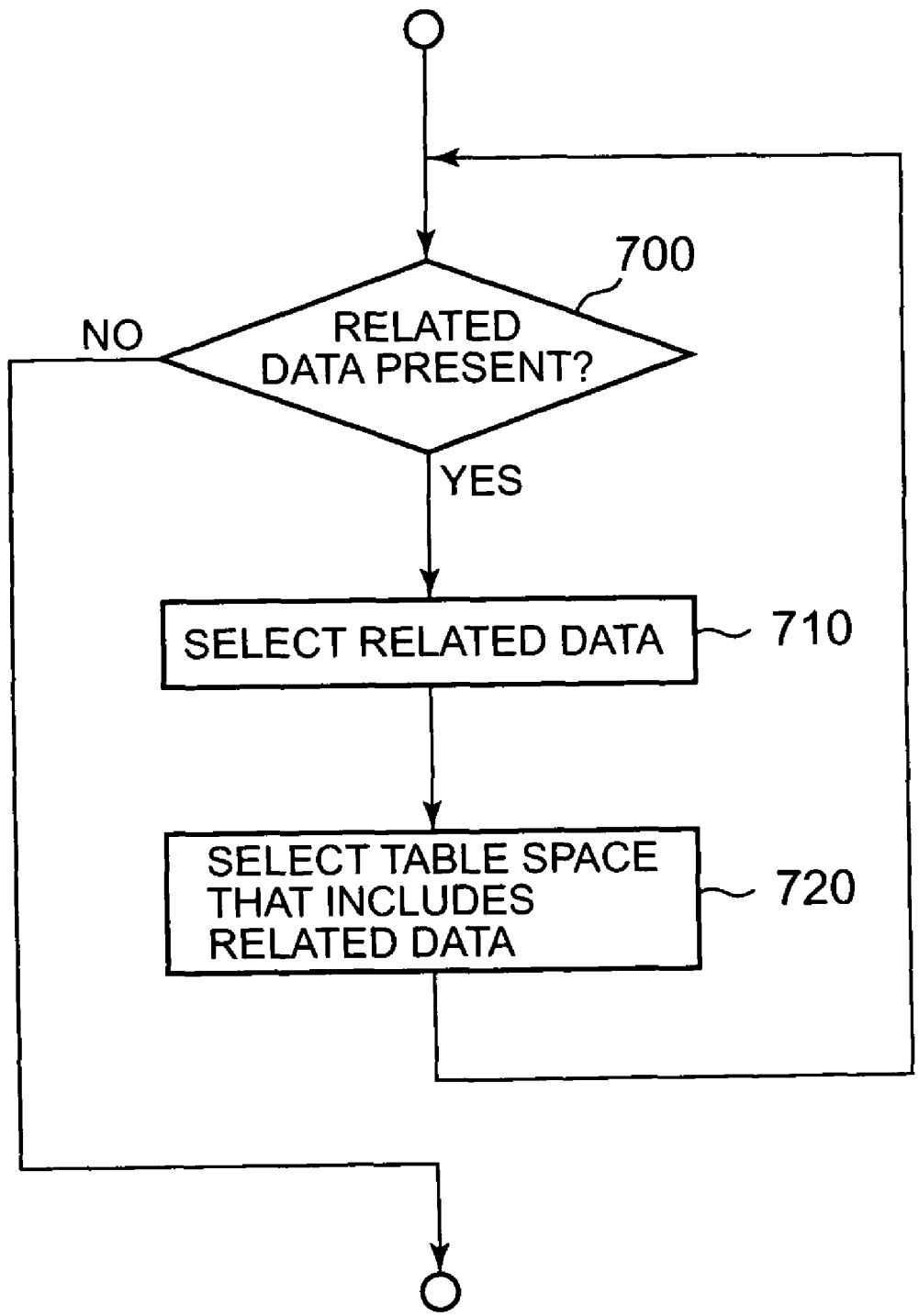
FIG. 7 depicts a detailed flowchart of step 630 of FIG. 6.

FIG. 7 depicts a detailed flowchart of the process of step 630 of FIG. 6. The backup generating apparatus 40 (FIG. 4) performs the following processing for each table space designated by the target designation information, or for each table space selected as a backup target by the additional backup target selecting section 455 (FIG. 4). First, in step 700, the related data selecting section 410 (FIG. 4) determines whether related data for that table space is present in another table space. In response to, in step 700, the related data selection section 410 (FIG. 4) determining that the related data is not present (NO at 700), the processing of FIG. 7 ends.

In response to, in step 700, the related data selection section 410 (FIG. 4) determining that the related data is present (YES at 700), in step 710, the related data selecting section 410 (FIG. 4) selects the related data. In step 720, the table space selecting section 420 (FIG. 4) selects a table space that includes the selected related data. Thereafter, the process beginning at step 700 is repeated in order to detect related data for the table space selected by the table space selecting section 420 (FIG. 4).

Figure 8:
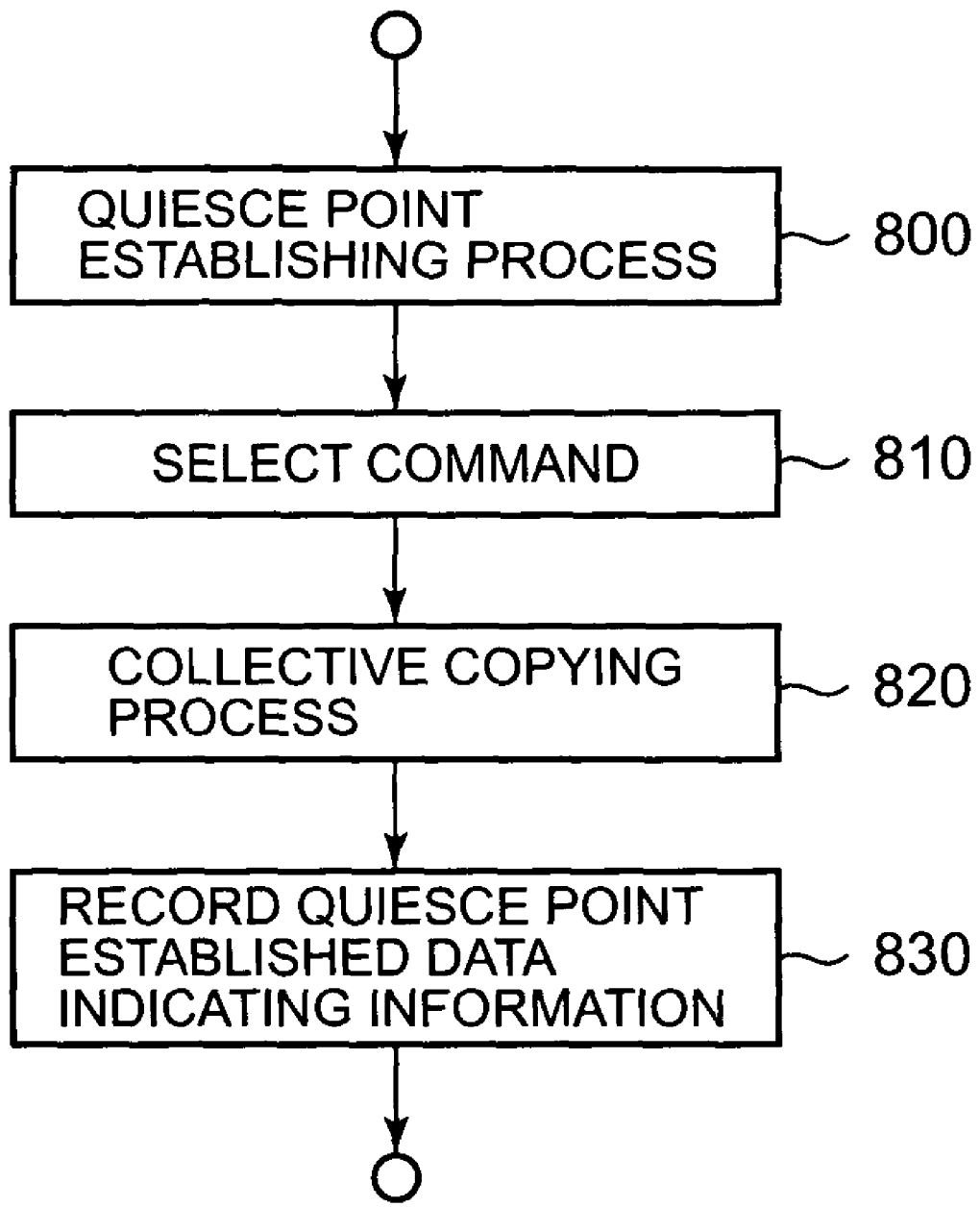
FIG. 8 depicts a detailed flowchart of step 670 of FIG. 6.

FIG. 8 depicts a detailed flowchart of the process of step 670 of FIG. 6. In step 800, the quiesce point establishing section 460 (FIG. 4) performs the quiesce point establishing process to complete an ongoing transaction for a backup target portion and inhibit any further transaction. In step 810, the backup generating section 470 (FIG. 4) obtains, for each storage device, a command corresponding to the model of that storage device from the command recording section 490 (FIG. 4), and, in step 820, executes the command to perform the collective copying process. In step 830, the backup information recording section 480 (FIG. 4) records, in association with a backup generated by the backup generating section 470 (FIG. 4), quiesce point established data indicating information that indicates data for which the backup has been generated with the quiesce point establishing process completed in each of the storage devices.

Figure 9:
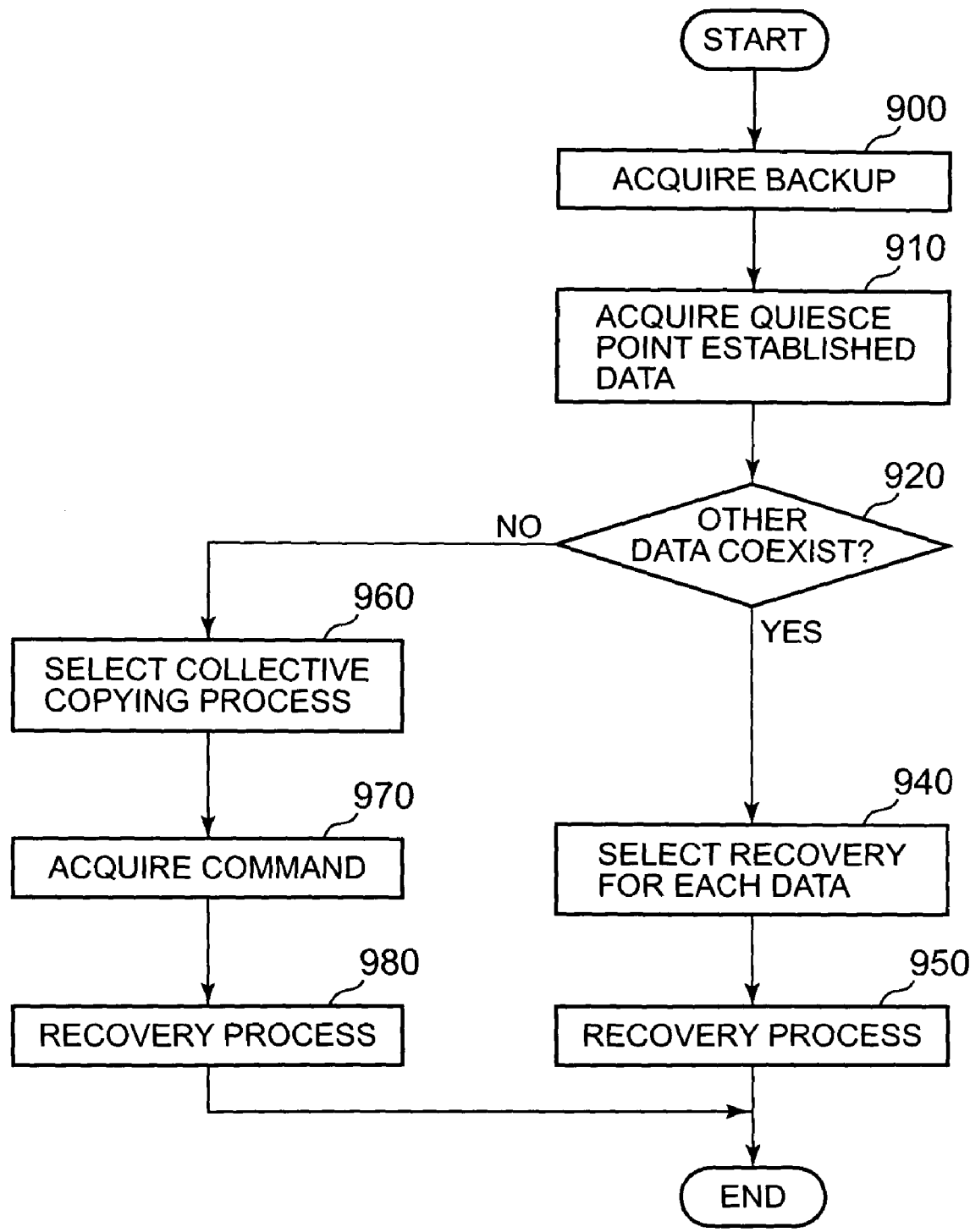
FIG. 9 depicts a flowchart of an embodiment of a process performed by the recovery processing apparatus to recover stored contents based on a backup.

FIG. 9 depicts a flowchart of an embodiment of the process performed by the recovery processing apparatus 50 (FIG. 5) for recovering the contents of a storage device based on a backup. In step 900, the backup acquiring section 500 (FIG. 5) acquires a backup generated by the backup generating apparatus 40 (FIG. 4) for each storage device. In step 910, the quiesce point established data indicating information acquiring section 510 (FIG. 5) acquires, in association with a backup of each storage device, quiesce point established data indicating information that indicates data for which a backup has been generated with the quiesce point establishing process completed in that storage device. In step 920, the coexistence determining section 520 (FIG. 5) determines, for each storage device, whether data other than the data indicated by the quiesce point established data indicating information is also stored.

In response to, in step 920, the coexistence determining section 520 (FIG. 5) determining that data other than the data indicated by the quiesce point established data indicating information is also stored in the storage device (YES at 920), in step 940, the recovery process selecting section 530 (FIG. 5) selects the recovery for each data indicated by the quiesce point established data indicating information. In step 950, the recovery processing section 550 (FIG. 5) recovers the contents of that storage device for each data indicated by the quiesce point established data indicating information. For example, the recovery processing section 550 (FIG. 5) may first recover the contents of the storage device in a reserved temporary storage area, and thereafter recover only each of designated files from the temporary storage area.

Alternately, in response to, in step 920, the coexistence determining section 520 (FIG. 5) determining that data other than the data indicated by the quiesce point established data indicating information is not stored in the storage device (NO at 920), in step 960, the recovery process selecting section 530 (FIG. 5) selects the recovery by the collective copying process. In step 970, the recovery processing section 550 (FIG. 5) obtains from the command recording section 540 (FIG. 5) a command for the collective copying process corresponding to the model of that storage device, and in step 980, executes the command to recover the contents of that storage device.

Various processes may be employed for collective copying depending on the model of the storage device, and in some embodiments, there is an optimal process to enable high speed processing for each model. For example, in storage devices that perform mirroring during normal operation, it is possible to perform the collective copying process at an extremely high speed by excluding one of the storage devices from the mirroring process. In this embodiment, the recovery processing section 550 (FIG. 5) executes a command for performing such exclusion as a collective copying command.

Another type of storage device does not actually perform the collective copying when a collective copying command is received, but successively creates collective copies in the succeeding process, so as to reduce waiting time in the processing. In this embodiment, the recovery processing section 550 (FIG. 5) executes a command instructing to start the collective copying as a collective copying process command. Thus, by executing an appropriate command which depends on the model, high-speed processing adapted for the model can be performed.

Figure 10:
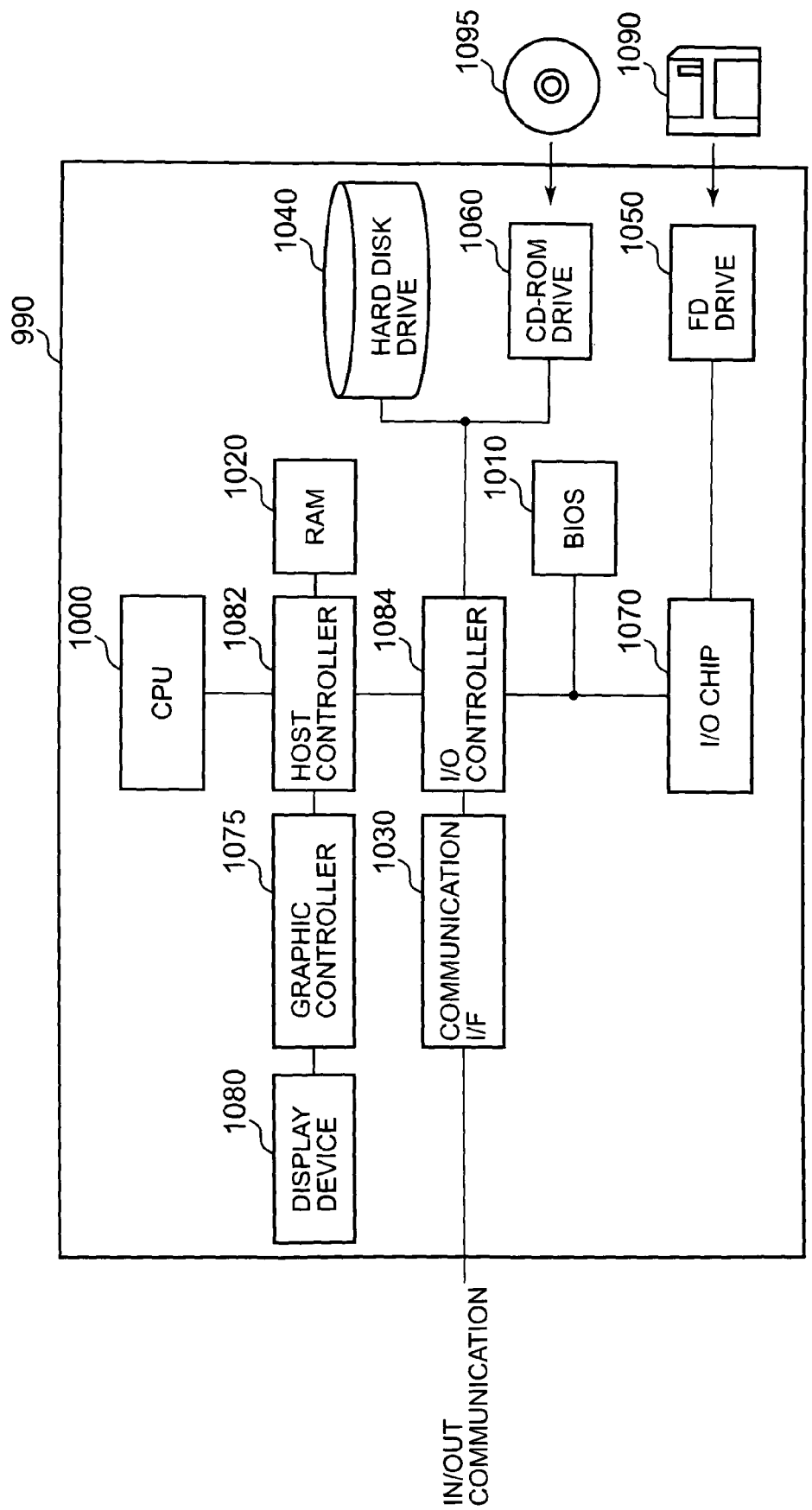
FIG. 10 depicts an exemplary hardware configuration of a data processing system that functions as a database system.

FIG. 10 depicts an exemplary hardware configuration of a data processing system 990, that is, a computer system, that functions as the database system 15 (FIG. 1). The data processing system 990 comprises a CPU-related portion including a central processing unit (CPU) 1000, a random access memory (RAM) 1020 and a graphic controller 1075, which are mutually coupled by a host controller 1082, an input/output portion including a communication interface (I/F) 1030, a hard disk drive 1040 and a compact disk-read only memory (CD-ROM) drive 1060, which are coupled to the host controller 1082 by an input/output (I/O) controller 1084, and a legacy input/output portion including a read only memory (ROM) 1010, a flexible disk drive (FD DRIVE) 1050 and an input/output (I/O) chip 1070, which are coupled to the input/output controller 1084.

The host controller 1082 couples the ROM 1020 to the CPU 1000 and the graphic controller 1075, which access the RAM 1020 at a high data transfer rate. The CPU 1000 is operated based on programs stored in the ROM 1010 and the RAM 1020. The graphic controller 1075 obtains image data that the CPU 1000 or other device generates in a frame buffer provided, for example, in the RAM 1020, and displays the image data on a display device 1080. The graphic controller 1075 may include a frame buffer for storing image data generated by the CPU 1000 or other device.

The input/output controller 1084 couples the host controller 1082 with the communication interface 1030, the hard disk drive 1040 and the CD-ROM drive 1060, which are relatively fast input/output devices. The communication interface 1030 communicates with external devices, for example, the storage devices 25-1 to 25-7, via a network. The hard disk drive 1040 is used to store programs and data used by the data processing system 990. The CD-ROM drive 1060 reads a program or data from a CD-ROM 1095, and provides it to the RAM 1020 or the hard disk drive 1040.

The input/output controller 1084 is also coupled to the ROM 1010 and to relatively slow input/output devices, such as the flexible disk drive 1050 and the input/output chip 1070. The ROM 1010 is used, for example, to store a boot program that the CPU 1000 executes when the data processing system 990 is activated, and other programs that depend on the hardware of the data processing system 990. The flexible disk drive 1050 reads a program or data from a flexible disk 1090, and provides it to the RAM 1020 or the hard disk drive 1040 via the input/output chip 1070. The input/output chip 1070 is used for coupling the flexible disk 1090 and various types of input/output devices via, for example, a parallel port, a serial port, a keyboard port and a mouse port.

In various embodiments, a program for the data processing system 990 is stored in a recording media, such as the flexible disk 1090, the CD-ROM 1095 or an IC card, and provided by the user. The program is read from the recording medium via the input/output chip 1070 and/or the input/output controller 1084, and is installed in and executed by the data processing system 990. The operation that the program causes the data processing system 990 to perform is as described above as the various embodiments performed by the database system 15 (FIG. 1) with reference to FIGS. 1 to 9. In various embodiments, the operation is to backup and/or recovery a database, as described above.

The above-described program may be stored on an external storage medium. As the storage medium, in addition to the flexible disk 1090, hard disk drive 1040 and the CD-ROM 1095, an optical recording medium such as a digital video disk (DVD) or a phase change dual disk (PD), a magneto-optical recording medium such as an mini-disk (MD), a tape medium, or a semiconductor memory such as an integrated circuit (IC) card can be employed. Further, a storage device, such as a hard disk or a RAM provided in a server system connected to a special communication network or the Internet may be employed as a recording medium, and the program may be provided to the data processing system 990 via the network.

Various additional embodiments will now be described. In some embodiments, a backup generating apparatus generates a backup of a database which is distributed and stored in a plurality of storage devices. The backup generating apparatus comprises a target designation information input section, a storage device selecting section, a quiesce point establishing section, a backup generating section, and a backup information recording section. The target designation information input section inputs a target designation, that is, target designation information, which designates a target database to be backed up. The storage device selecting section selects all storage devices which store at least a portion of the target database. The quiesce point establishing section establishes a quiesce point by completing an ongoing transaction for the target database and inhibits any further transaction when the target designation information input section inputs the target designation information. The backup generating section generates a backup by collectively copying, for each of the storage devices selected by the storage device selecting section, the entire contents of that storage device on condition that the quiesce point has been established. The backup information recording section records, in association with the backup generated by the backup generating section, quiesce point established data indicating information indicating data in each of the storage devices which has been backed up with the quiesce point established.

In some embodiments, the backup generating apparatus further comprises a coexistence determining section and an additional backup target selecting section. The coexistence determining section determines, for each of the storage devices selected by the storage device selecting section, whether at least a portion of a different database is also stored in that storage device. The additional backup target selecting section selects the different database as a backup target based on an instruction from a user when at least a portion of the different database is stored in one of the storage devices selected by the storage device selecting section. The storage device selecting section further selects all storage devices which store the different database selected by the additional backup target selecting section. The quiesce point establishing section establishes a quiesce point for a portion including not only the target database but also the different database.

In various embodiments, the backup generating apparatus also comprises a constituent data identification information acquiring section for acquiring, in association with each of the databases, identification information for a plurality of constituent data which constitute that database. The storage device selecting section selects, for each of the constituent data associated with the target database, all storage devices which store that constituent data when the entire target database is designated by the target designation information. In some embodiments, the backup generating section further generates a backup for management information used to manage the target database on condition that the target database has been designated by the target designation information.

In some embodiments, the backup generating apparatus further comprises a command recording section for recording, in association with information indicating a type of a storage device, that is, a type indicator, a command to perform the collective copying process in a storage device of that type. The backup generating section performs the collective copying process for each of the storage devices by obtaining a command associated with the type of storage device from the command recording section and executing the command.

In various embodiments, a recovery processing apparatus for recovering the stored contents of a database based on a backup generated for each of the storage devices is provided. The database is distributed and stored in a plurality of storage devices. The recovery processing apparatus comprises a backup acquiring section, a quiesce point established data indicating information acquiring section for acquiring, a recovery process selecting section, and a recovery processing section. The backup acquiring section acquires the backup for each storage device. The quiesce point established data indicating information acquiring section acquires, in association with the backup for each of the storage devices, quiesce point established data indicating information indicating data in that storage device, which has been backed up with the quiesce point established. The recovery process selecting section selects, for each of the storage devices, either recovery of the stored contents of that storage device by collectively copying the entire contents thereof, or recovery of each data identified by the quiesce point established data indicating information. The recovery processing section recovers, for each of the storage devices, the stored contents of that storage device by the collective copying process on condition that the recovery by the collective copying process has been selected, or the stored contents of that storage device for each data indicated by the quiesce point established data indicating information on condition that the recovery for each data indicated by the quiesce point established data indicating information has been selected.

In some embodiments, the recovery processing apparatus further comprises a command recording section for recording, in association with information indicating a type of a storage device, a command to perform the collective copying process in a storage device of that type. The recovery processing section performs the collective copying process for each of the storage devices by obtaining from the command recording section a command associated with the type of that storage device on condition that the recovery by the collective copying process has been selected, and executing that command.

In various embodiments, the recovery processing apparatus further comprises a coexistence determining section for determining, for each of the storage devices, whether data other than data indicated by the quiesce point established data indicating information is stored in that storage device. The recovery process selecting section selects, for each of the storage devices, recovery for each data indicated by the quiesce point established data indicating information on condition that data other than the data indicated by the quiesce point established data indicating information is stored, or selects recovery by the collective copying process on condition that data other than the data indicated by the quiesce point established data indicating information is not stored.

Another embodiment of a backup generating apparatus for generating a backup of a database is provided. The backup generating apparatus comprises a target designation information input section, a related data selecting section, and a backup generating section. The target designation information input section inputs target designation information designating target data in the database for which a backup is to be generated. The related data selecting section selects related data in the database which should be updated together with the target data in order to maintain consistency of the database. The backup generating section generates a backup for data formed by adding the related data selected by the related data selecting section to the target data. In same embodiments, this backup generating apparatus further comprises a quiesce point establishing section for establishing a quiesce point by completing an ongoing transaction for the target data and the related data and inhibiting any further transaction when the related data is selected by the related data selecting section, wherein the backup generating section generates backups for the target data and the related data on condition that the quiesce point has been established. In various embodiments, the target designation information input section inputs the target designation information designating, as the target data, one of a plurality of table spaces each of which constitutes a portion of the database; a table space selecting section selects a table space including related data selected by the related data selecting section is further included; wherein, for each of the table spaces selected by the table space selecting section, the related data selecting section selects related data for all the data included in that table space; the table space selecting section further selects a table space including related data further selected by the related data selecting section; and the backup generating section generates a backup for data obtained by adding all the table spaces selected by the table space selecting section to the target data.

In various embodiments, a recovery processing method for recovering the stored contents of a database based on a backup generated for each of the storage devices, is provided. The database is distributed and stored in a plurality of storage devices. The recovery processing method comprises a backup acquiring step of acquiring the backup for each storage device; a quiesce point established data indicating information acquiring step of acquiring, in association with the backup for each of the storage devices, quiesce point established data indicating information indicating data in that storage device, which has been backed up with the quiesce point established; a recovery process selecting step of selecting, for each of the storage devices, either recovery of the stored contents of that storage device by collectively copying the entire contents thereof, or recovery of each data identified by the quiesce point established data indicating information; and a recovery processing step of recovering, for each of the storage devices, the stored contents of that storage device by the collective copying process on condition that the recovery by the collective copying process has been selected, or the stored contents of that storage device for each data indicated by the quiesce point established data indicating information on condition that the recovery for each data indicated by the quiesce point established data indicating information has been selected.

In various embodiments, a program for causing a data processing system to function as a backup generating apparatus for generating a backup of a database is provided. The database is distributed and stored in a plurality of storage devices. The program causes the data processing system to function as: a target designation information input section for inputting target designation information for designating a target database to be backed up; a storage device selecting section for selecting all storage devices which store at least a portion of the target database; a quiesce point establishing section for establishing a quiesce point by completing an ongoing transaction for the target database and inhibiting any further transaction when the target designation information input section inputs the target designation information; a backup generating section for generating a backup by collectively copying, for each of the storage devices selected by the storage device selecting section, the entire contents of that storage device on condition that the quiesce point has been established; and a backup information recording section for recording, in association with the backup generated by the backup generating section, quiesce point established data indicating information indicating data in each of the storage devices which has been backed up with the quiesce point established.

In various embodiments, a program is provided for causing a data processing system to function as a recovery processing apparatus for recovering the stored contents of a database which is distributed and stored in a plurality of storage devices, based on a backup generated for each of the storage devices. The program causes the data processing system to function as: a backup acquiring section for acquiring the backup for each storage device; a quiesce point established data indicating information acquiring section for acquiring, in association with the backup for each of the storage devices, quiesce point established data indicating information indicating data in that storage device, which has been backed up with the quiesce point established; a recovery process selecting section for selecting, for each of the storage devices, either recovery of the stored contents of that storage device by collectively copying the entire contents thereof, or recovery of each data identified by the quiesce point established data indicating information; and a recovery processing section for recovering, for each of the storage devices, the stored contents of that storage device by the collective copying process on condition that the recovery by the collective copying process has been selected, or the stored contents of that storage device for each data indicated by the quiesce point established data indicating information on condition that the recovery for each data indicated by the quiesce point established data indicating information has been selected.

In some embodiments, a program is provided for causing a data processing system to function as a backup generating apparatus for generating a backup of a database. The program causes the data processing system to function as: a target designation information input section for inputting target designation information designating target data in the database for which a backup is to be generated; a related data selecting section for selecting related data in the database which should be updated together with the target data in order to maintain consistency of the database; and a backup generating section for generating a backup for data formed by adding the related data selected by the related data selecting section to the target data.

According to various embodiments of the database system 15 (FIG. 1), even when a database is distributed and stored in a plurality of storage devices of different models, a backup can be generated with the consistency of the database being maintained. In addition, when a plurality of databases coexist in a single storage device, a backup of a designated database can be appropriately generated by a fast collective copying process that collectively copies the entire storage device. In addition, even when a backup is to be generated not only for the entire database but also for a table space that constitutes a portion of the database, the fast process can be performed with the consistency of the database being maintained.

The invention has been described by way of specific embodiments, but those skilled in the art will understand that various changes in form and detail may be made without deviating from the spirit or scope of the invention.

What is claimed is:

1. A computer-implemented method of backing up a database, the database being distributed in a plurality of storage devices, comprising:
receiving a target designation designating a target database, the target database including a first set of tables, wherein one or more tables in the first set of tables is distributed in a first plurality of table spaces, which first plurality of table spaces are distributed and stored in the plurality of storage devices, and a first management information storage area storing management information specifying how the first set of tables and the first plurality of table spaces are distributed across the plurality of storage devices;
selecting two or more storage devices, of the plurality of storage devices, storing at least a portion of the target database;
establishing a quiesce point by completing an ongoing transaction for the target database and inhibiting a further transaction;
in response to establishing the quiesce point, generating a backup by collectively copying data on each storage device of the two or more selected storage devices; and
recording the backup associated with a quiesce point indication indicating backed up data of the said each storage device of the two or more selected storage devices in accordance with the quiesce point;
determining, for said each storage device, whether at least a portion of a different database distributed in the plurality of storage devices is stored in said each storage device, the different database including a second set of tables that is different from the first set of tables, wherein one or more tables in the second set of tables is distributed in a second plurality of table spaces, which second plurality of table spaces are distributed and stored in the plurality of storage devices, and a second management information storage area storing management information specifying how the second set of tables and the second plurality of table spaces are distributed across the plurality of storage devices;
selecting the different database as another target database; and
selecting one or more additional storage devices storing the another target database,
wherein said establishing establishes the quiesce point for the target database and the another target database,
wherein said generating generates the backup by collectively copying the data on said each storage device and each of the one or more additional storage devices, and
wherein said recording records the backup associated with the quiesce point indication indicating backed up data of said each storage device and said each of the one or more additional storage devices.

2. The method of claim 1, further comprising:
acquiring a constituent indication identifying a plurality of constituent data constituting the target database,
wherein said selecting selects the two or more storage devices based on the constituent data, wherein the two or more storage devices store the constituent data.

3. The method of claim 2, wherein said generating generates a backup of management information of the target database.

4. The method of claim 1, further comprising:
recording, in association with a type indicator indicating a type of said each storage device, a command to perform a collective copying process,
wherein said generating performs the collective copying process for said each storage device by obtaining and executing the command associated with the type of said each storage device.

5. The method of claim 1, further comprising:
acquiring the backup of the two or more selected storage devices;
acquiring, in association with the backup, the quiesce point indication indicating the backed up data of said each storage device of the two or more selected storage devices in accordance with the quiesce point; and
recovering the backed up data of the two or more selected storage devices by collective copying.

6. The method of claim 5, wherein said recovering obtains and executes the command to perform collective copying based on the type of said each storage device.

7. A computer program product comprising a computer usable medium having computer usable program code for backing up a database, the database being distributed in a plurality of storage devices, said computer program product including:

computer usable program code for receiving a target designation designating a target database, the target database including a first set of tables, wherein one or more tables in the first set of tables is distributed in a first plurality of table spaces, which first plurality of table spaces are distributed and stored in the plurality of storage devices, and a first management information storage area storing management information specifying how the first set of tables and the first plurality of table spaces are distributed across the plurality of storage devices;

computer usable program code for selecting two or more storage devices, of the plurality of storage devices, storing at least a portion of the target database;

computer usable program code for establishing a quiesce point by completing an ongoing transaction for the target database and inhibiting a further transaction;

computer usable program code for in response to establishing the quiesce point, generating a backup by collectively copying data on each storage device of the two or more selected storage devices; and computer usable program code for recording the backup associated with a quiesce point indication indicating backed up data of the said each storage device of the two or more selected storage devices in accordance with the quiesce point;

computer usable program code for determining, for said each storage device, whether at least a portion of a different database distributed in the plurality of storage devices is stored in said each storage device, the different database including a second set of tables that is different from the first set of tables, wherein one or more tables in the second set of tables is distributed in a second plurality of table spaces, which second plurality of table spaces are distributed and stored in the plurality of storage devices, and a second management information storage area storing management information specifying how the second set of tables and the second plurality of table spaces are distributed across the plurality of storage devices;

computer usable program code for selecting the different database as another target database; and computer usable program code for selecting one or more additional storage devices storing the another target database, wherein said computer usable program code for establishing establishes the quiesce point for the target database and the another target database, wherein said computer usable program code for generating generates the backup by collectively copying the data on said each storage device and each of the one or more additional storage devices, and wherein said computer usable program code for recording records the backup associated with the quiesce point indication indicating backed up data of said each storage device and said each of the one or more additional storage devices.

8. A system for backing up a database, the database being distributed in a plurality of storage devices, comprising:

means for receiving a target designation designating a target database, the target database including a first set of tables, wherein one or more tables in the first set of tables is distributed in a first plurality of table spaces, which first plurality of table spaces are distributed and stored in the plurality of storage devices, and a first management information storage area storing management information specifying how the first set of tables and the first plurality of table spaces are distributed across the plurality of storage devices;

means for selecting two or more storage devices, of the plurality of storage devices, storing at least a portion of the target database;

means for establishing a quiesce point by completing an ongoing transaction for the target database and inhibiting a further transaction;

means for generating a backup by collectively copying data on each storage device of the two or more selected storage devices, in response to establishing the quiesce point; and means for recording the backup associated with a quiesce point indication indicating backed up data of the said each storage device of the two or more selected storage devices in accordance with the quiesce point;

means for determining, for said each storage device, whether at least a portion of a different database distributed in the plurality of storage devices is stored in said each storage device, the different database including a second set of tables that is different from the first set of tables, wherein one or more tables in the second set of tables is distributed in a second plurality of table spaces, which second plurality of table spaces are distributed and stored in the plurality of storage devices, and a second management information storage area storing management information specifying how the second set of tables and the second plurality of table spaces are distributed across the plurality of storage devices;

means for selecting the different database as another target database; and means for selecting one or more additional storage devices storing the another target database, wherein said means for establishing establishes the quiesce point for the target database and the another target database, wherein said means for generating generates the backup by collectively copying the data on said each storage device and each of the one or more additional storage devices, and wherein said means for recording records the backup associated with the quiesce point indication indicating backed up data of said each storage device and said each of the one or more additional storage devices.

* * * * *